United States Patent
Shin et al.

(10) Patent No.: US 10,712,873 B2
(45) Date of Patent: Jul. 14, 2020

(54) DISPLAY DEVICE

(71) Applicant: LG DISPLAY CO., LTD., Seoul (KR)

(72) Inventors: SeungHwan Shin, Jeonju-si (KR);
DaeYoung Seo, Paju-si (KR);
YoungMin Jeong, Paju-si (KR);
SoYoung Lee, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/223,065

(22) Filed: Dec. 17, 2018

(65) Prior Publication Data

US 2019/0204989 A1   Jul. 4, 2019

(30) Foreign Application Priority Data

Dec. 29, 2017   (KR) .......................... 10-2017-0184455

(51) Int. Cl.
*G06F 3/042*   (2006.01)
*G06F 3/041*   (2006.01)

(52) U.S. Cl.
CPC ............ *G06F 3/0421* (2013.01); *G06F 3/042* (2013.01); *G06F 3/0412* (2013.01); *G06F 3/0416* (2013.01); *G06F 3/04164* (2019.05)

(58) Field of Classification Search
CPC .... G06F 3/04164; G06F 3/0421; G06F 3/042; G06F 3/0412; G06F 3/0416
See application file for complete search history.

(56) References Cited

U.S. PATENT DOCUMENTS

| 2012/0056663 | A1 | 3/2012 | Oh et al. |
| 2013/0050148 | A1* | 2/2013 | Jeon ...................... G06F 3/0386 345/175 |
| 2014/0015801 | A1* | 1/2014 | Chung .................... G06F 3/042 345/175 |
| 2014/0139489 | A1* | 5/2014 | Hwang .................. G06F 3/042 345/175 |

FOREIGN PATENT DOCUMENTS

JP   2011215904 A   10/2011

OTHER PUBLICATIONS

Combined Search and Examination Report issued in GB Application No. 1820834.8 dated May 31, 2019.
Examination Statement issued by Taiwan Intellectual Property Office in TW Application No. 107143549 dated Aug. 29, 2019 (translation dated Sep. 12, 2019).

* cited by examiner

*Primary Examiner* — Muhammad N Edun
(74) *Attorney, Agent, or Firm* — Polsinelli PC

(57) ABSTRACT

A display device according to the present disclosure includes a sensor pixel unit including a plurality of pixels, a photo touch sensor in the sensor pixel unit, a read out line which is disposed in a second direction and transmits a touch sensing signal by the photo touch sensor, a sensor data line which is disposed in the second direction and applies a sensor data signal to the photo touch sensor, and a sensor display gate line which is disposed in a first direction different from the second direction and applies a sensor gate signal to the photo touch sensor and applies a display gate signal to the plurality of pixels.

19 Claims, 11 Drawing Sheets

DISPLAY DEVICE

CROSS REFERENCE TO RELATED APPLICATION

This application claims the priority of Korean Patent Application No. 10-2017-0184455 filed on Dec. 29, 2017, in the Korean Intellectual Property Office, the disclosure of which is incorporated herein by reference in its entirety.

BACKGROUND

Field of the Disclosure

The present disclosure relates to a display device, and more particularly, to a display device in which a photo touch sensor is disposed. Although the present disclosure is suitable for a wide scope of applications, it is particularly suitable for improving an aperture ratio of the display device by combining a sensor gate line and a display gate line for applying a gate signal to a photo touch sensor.

Description of the Background

As it enters an information era, a display field which visually expresses electrical information signals has been rapidly developed and in response to this, various display devices having excellent performances such as thin-thickness, light weight, and low power consumption have been developed. Examples of such a display device include a liquid crystal display device (LCD) and an organic light emitting display device (OLED).

Recently, in the display device, a touch screen is widely used to allow a user to easily, intuitively, and conveniently input information and commands departing from a normal input method such as a button, a keyboard, and a mouse. In other words, the touch screen is one of input devices which are installed in an image display device so that the user pressurizes a touch sensor in the touch screen to input predetermined information while watching the image display device.

The touch screen can be classified into an add-on type, an on-cell type, and an in-cell type depending on a structure and among them, a touch screen integrated display device (in-cell type) is broadly used because the display device can be manufactured to be thinner and durability can be improved.

As a touch sensor of a touch screen integrated display device, a photo touch sensor which recognizes a touch in accordance with intensity of light and a capacitive touch sensor which recognizes the touch in accordance with variable capacitance are mainly used.

Specifically, the photo touch sensor recognizes touches through a light leakage current of a photo transistor which is generated from incident light or reflected light by a touched object. When the photo touch sensor is embedded in the display panel, a driving line and a storage line need to be further provided to apply a driving signal to the photo touch sensor. Therefore, there is a problem in that an aperture ratio of the touch screen integrated display device including the photo touch sensor is reduced.

SUMMARY

Accordingly, the present disclosure is directed to a display device that substantially obviates one or more of problems due to limitations and disadvantages of the prior art.

Additional features and advantages of the disclosure will be set forth in the description which follows and in part will be apparent from the description, or may be learned by practice of the invention. Other advantages of the present disclosure will be realized and attained by the structure particularly pointed out in the written description and claims hereof as well as the appended drawings.

More particularly, the present disclosure is to provide a display device in which a sensor gate line and a display gate line which apply a gate signal to a photo touch sensor are combined to improve the aperture ratio of the display device.

In addition, the present disclosure is to provide a display device in which photo touch sensors are distributed in every gate line in consideration of capacitance to improve visibility of the display device.

The present disclosure are not limited to the above-mentioned objects, and other objects, which are not mentioned above, can be clearly understood by those skilled in the art from the following descriptions.

According to an aspect of the present disclosure, a display device includes a sensor pixel unit formed by a plurality of pixels, a photo touch sensor disposed in the sensor pixel unit, a read out line which is disposed in a second direction and transmits a touch sensing signal by the photo touch sensor, a sensor data line which is disposed in the second direction and applies a sensor data signal to the photo touch sensor, and a sensor display gate line which is disposed in a first direction different from the second direction and applies a sensor gate signal to the photo touch sensor and applies a display gate signal to the plurality of pixels. Therefore, according to the display device according to the aspect of the present disclosure, a sensor display gate line which applies a sensor gate signal to the photo touch sensor and applies a display gate signal to some pixels electrically connected thereto is disposed so that there is no need to provide lines which separately transmit the sensor gate signal and the display gate signal, thereby reducing an aperture ratio of the display device.

According to another aspect of the present disclosure, a display device includes a display panel which includes a plurality of gate lines disposed in a first direction, a plurality of data lines disposed in a second direction different from the first direction, and photo touch sensors which sense a touch in response to a light intensity, a touch driving circuit which receives a touch sensing signal output from each of the photo touch sensors, and a read out line which transmits a touch sensing signal output from the display panel to the touch driving circuit, in which a photo sensor which is disposed in a read out line which intersects an N-th (N is a positive integer) gate line among the plurality of gate lines is disposed in an N+2-th gate line or a gate line disposed with an interval of (N+2M) (M is a positive integer) and a read out line which intersects the N+2M-th gate line. Therefore, in the display device according to another aspect of the present disclosure, the photo touch sensors are distributed to be disposed in consideration of a capacitance of the gate line so that the photo touch sensors are not regularly disposed. Therefore, the user cannot recognize the degradation of the visibility due to aperture ratio difference.

Other detailed matters of the aspects are included in the detailed description and the drawings.

According to the present disclosure, a sensor gate line which applies a gate and a display gate line which applies a display gate signal to a photo touch sensor are combined to improve the aperture ratio of the display device with embedded photo sensor.

According to the present disclosure, photo touch sensors are distributed in different gate lines in consideration of capacitance Cap for every gate line, to improve visibility of the display device.

The effects according to the present disclosure are not limited to the contents exemplified above, and more various effects are included in the present disclosure.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
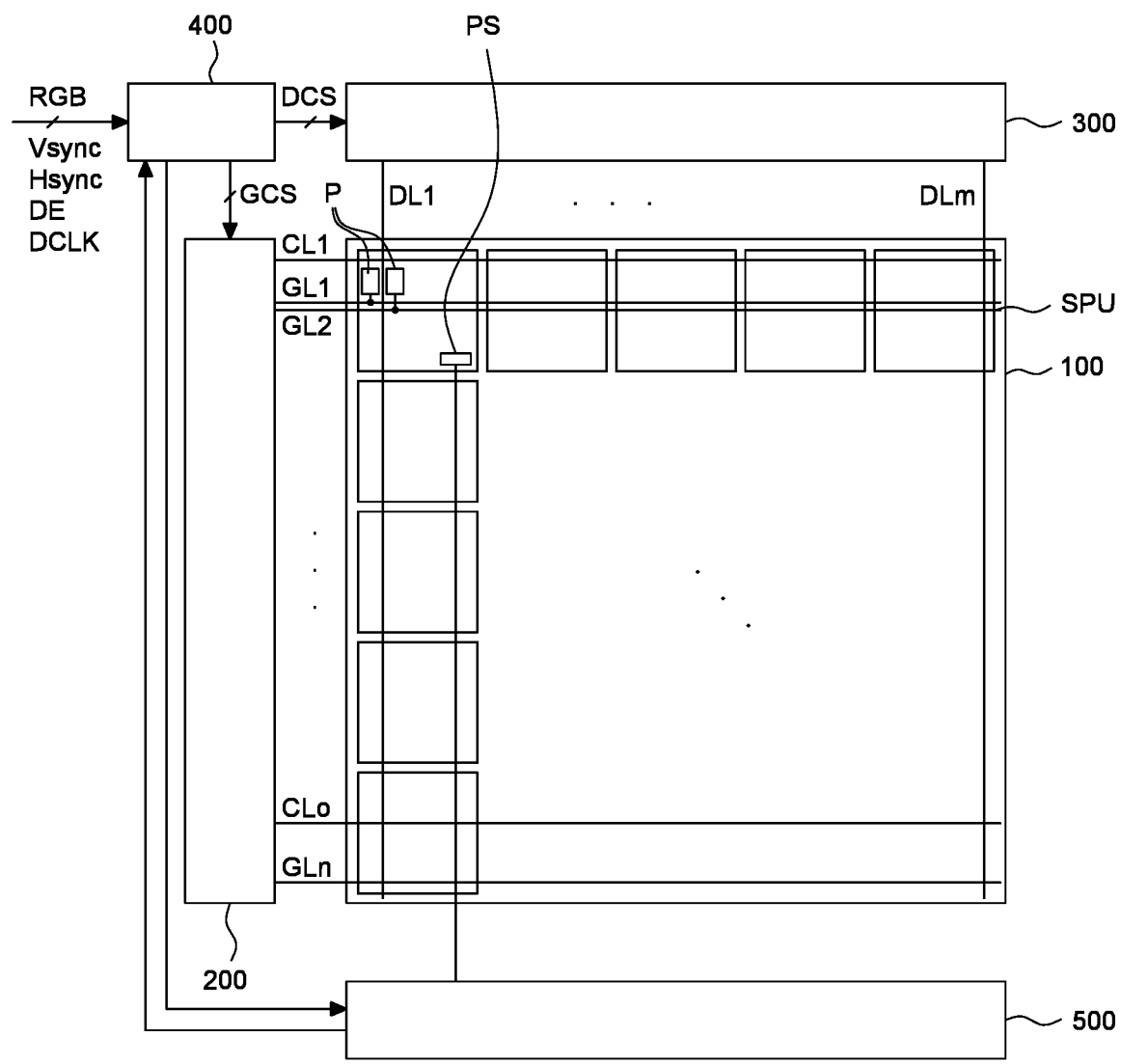
FIG. 1 is a block diagram illustrating a display device according to an exemplary aspect of the present disclosure.

Advantages and characteristics of the present disclosure and a method of achieving the advantages and characteristics will be clear by referring to exemplary aspects described below in detail together with the accompanying drawings. However, the present disclosure is not limited to the aspects disclosed herein but will be implemented in various forms. The aspects are provided by way of example only so that a person of ordinary skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary aspects of the present disclosure are merely examples, and the present disclosure is not limited thereto. Like reference numerals generally denote like elements throughout the specification. Further, in the following description, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly" is not used.

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various aspects of the present disclosure can be partially or entirely bonded to or combined with each other and can be interlocked and operated in technically various ways, and the aspects can be carried out independently of or in association with each other.

Exemplary aspects of the present disclosure have been described with respect to a liquid crystal display device, but the present disclosure is not limited to the liquid crystal display device and may be applied to all display devices including a gate driving circuit, such as an organic light emitting display device.

Hereinafter, the present disclosure will be described in detail with reference to the drawings.

FIG. 1 is a block diagram illustrating a display device according to an exemplary aspect of the present disclosure.

Referring to FIG. 1, a display device according to an exemplary aspect of the present disclosure includes a display panel 100, a gate driving circuit 200, a data driving circuit 300, a timing controller 400, and a touch driving circuit 500.

In the display panel 100, gate lines GL1 to GLn and common lines CL1 to CLo are disposed in a first direction and data lines DL1 to DLm are disposed in a second direction which is different from the first direction. A plurality of pixels P is electrically connected to the gate lines GL1 to GLn, the data lines DL1 to DLm, and the common lines CL1 to CLo and displays images by a pixel driving signal or a pixel driving voltage applied through the gate lines GL1 to GLn, the data lines DL1 to DLm, and the common lines CL1 to CLo. The display panel 100 according to the exemplary aspect of the present disclosure is configured by a double rate driving (DRD) structure in which one pair of pixels P adjacent to each other are commonly connected to one data line DL. The DRD structure is a method for implementing the same resolution while reducing the number of data integrated circuits which configure a data driving circuit by reducing the number of data lines by half, instead of doubling the number of gate lines, as compared with a normal display panel. As described above, the display panel 100 according to the exemplary aspect of the present disclosure has the DRD structure so that the sensor data line is disposed using an area where data lines of the related art are disposed and the photo touch sensor is disposed in an area where two gate lines are disposed to be adjacent to each other. Therefore, as compared with the normal display device, a photo touch sensor PS which senses the touch may be provided without reducing the aperture ratio.

The display panel 100 includes a plurality of pixels P and displays images based on a gray scale displayed by each pixel P. Each of the plurality of pixels P includes a pixel electrode which is driven by a signal applied through the gate lines GL1 to GLn and the data lines DL1 to DLm and a common electrode driven through the common lines CL1 to CLo. In each of the plurality of pixels P, liquid crystals are tilted by a voltage difference between the pixel electrode and the common electrode to display images. The plurality of pixels P illustrated in FIG. 1 may be sub pixels which display different colors or a plurality of sub pixels forms one unit to form one pixel. For example, the sub pixels may display red, green, and blue or red, green, blue, and white.

In the display panel 100, a plurality of sensor pixel units SPU may be defined. The sensor pixel unit SPU includes a photo touch sensor PS which recognizes the touch in accordance with the change of off-current which varies in accordance with the intensity of light. More specifically, the photo touch sensor PS includes a sensor transistor and a sensor storage. The sensor transistor is turned on in accordance with the intensity of light so that voltage is charged in the sensor storage and the charged voltage is output to a read out line RL at a predetermined timing to recognize a touch. Such a structure of the plurality of sensor pixel units SPU will be described in more detail with reference to the following drawings.

The gate driving circuit 200 sequentially supplies gate signals to the gate lines GL1 to GLn of the display panel 100 in accordance with a gate driving control signal GCS transmitted from the timing controller 400. The gate driving circuit 200 may include a shift register or a level shifter. The gate driving circuit 200 may be independently disposed from the display panel 100 or may be embedded as a thin film type on a non-display area where the pixel P of the display panel 100 is not disposed by a gate in panel (GIP) method at the time of manufacturing a substrate of the display panel 100.

The data driving circuit 300 generates a sampling signal by a data driving control signal DCS transmitted from the timing controller 400 and changes the image data into a data signal DS by latching the image data input from the timing controller 400 in accordance with the sampling signal, and then supplies the data signal to the data lines DL1 to DLm in response to a source output enable (SOE) signal. The data driving circuit 300 is connected to a bonding pad of the display panel 100 by a chip on glass (COG) method or may be directly disposed on the display panel 100. In some cases, the data driving circuit 300 may be disposed to be integrated with the display panel 100. Further, the data driving circuit 300 may be implemented by a chip on film (COF) method.

The timing controller 400 transmits an input image signal RGB received from a host system to the data driving circuit 300. The timing controller 400 generates a timing control signal for controlling an operation timing of the gate driving circuit 200 and the data driving circuit 300 using timing signals such as a clock signal DCLK, a horizontal synchronization signal Hsync, a vertical synchronization signal Vsync, and a data enable signal DE which are received together with the input image signal RGB. The timing controller 400 is synchronized with the timing signal to generate a control signal GCS of the gate driving circuit 200 and a control signal DCS of the data driving circuit 300.

The timing controller 400 generates a touch driving signal for driving the photo touch sensor PS to transmit the touch driving signal to the touch driving circuit 500. Further, the timing controller 400 receives the touch sensing signal from the touch driving circuit 500 to calculate touch information.

The touch driving circuit 500 may apply the touch driving signal transmitted from the timing controller 400 to the photo touch sensor PS. The touch driving circuit 500 may determine whether to be touched by receiving the touch sensing signal transmitted from the photo touch sensor PS.

Figure 2:
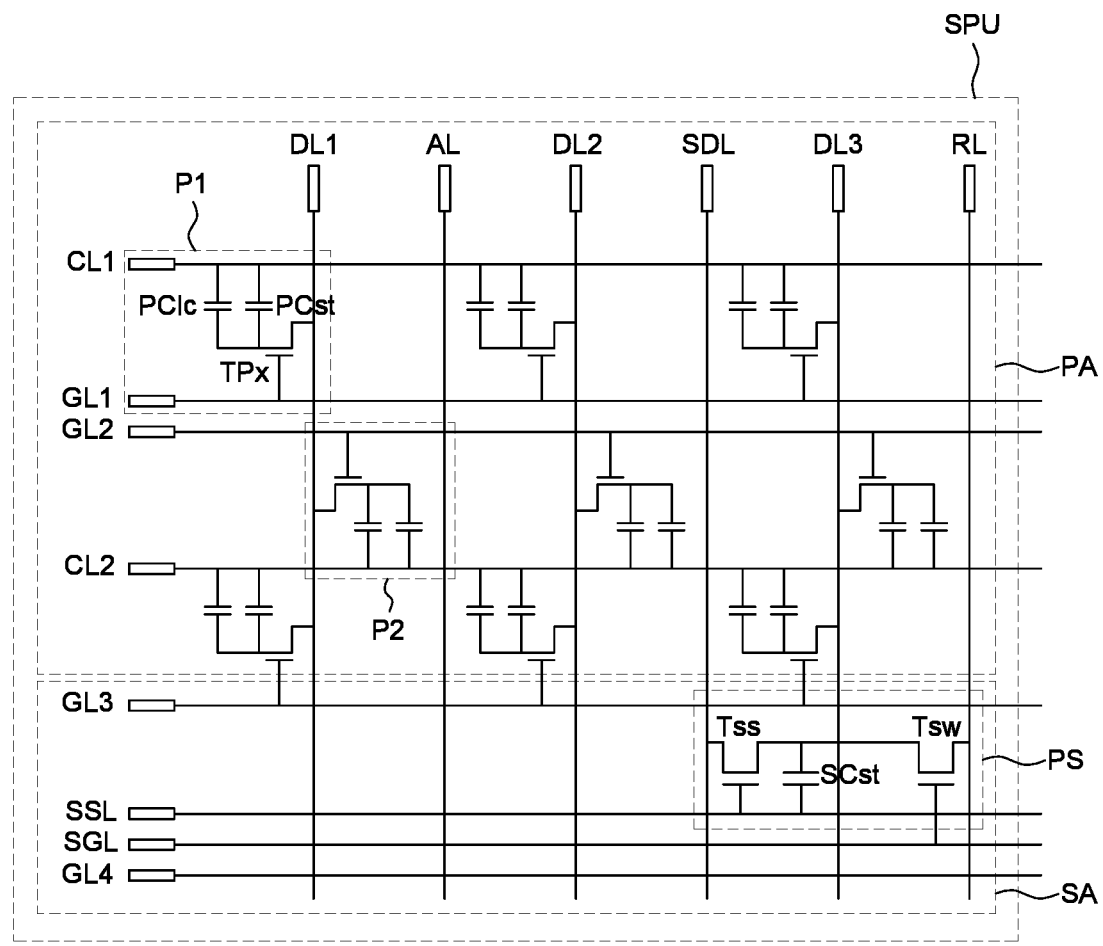
FIG. 2 is an equivalent circuit diagram illustrating an example of a sensor pixel block disposed in a display panel according to an exemplary aspect of the present disclosure.
Figure 3:
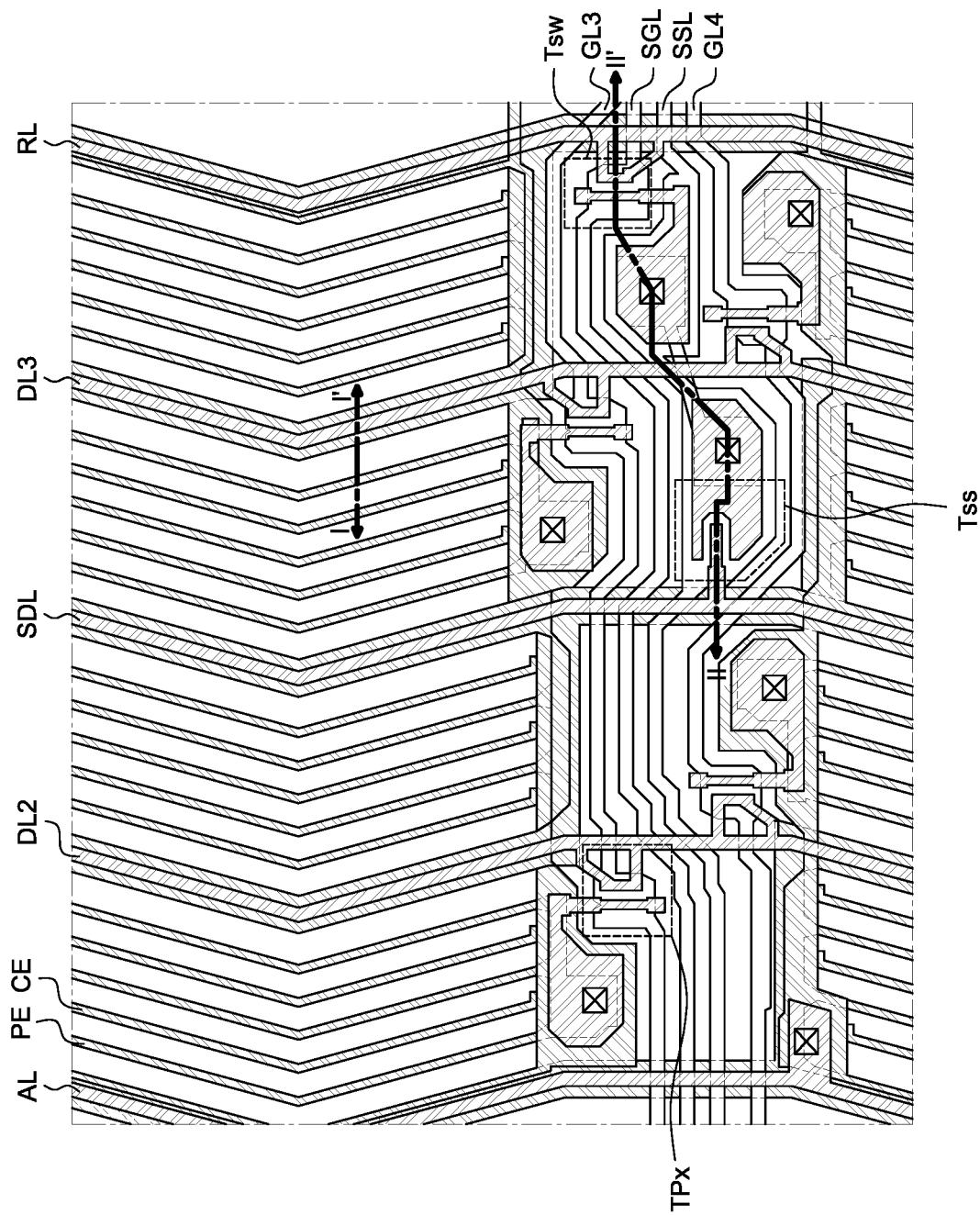
FIG. 3 is a plan view of a sensor pixel block of FIG. 2.
Figure 4:
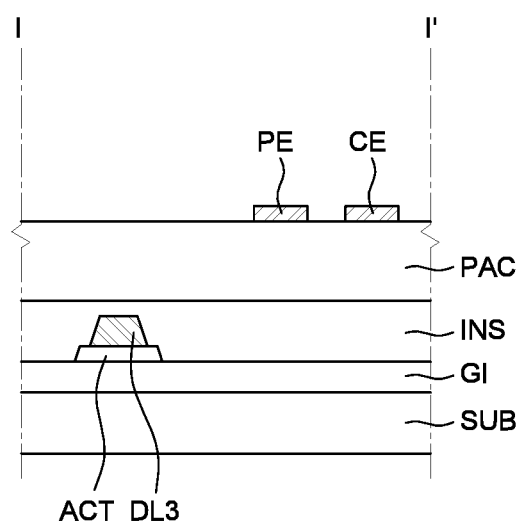
FIG. 4 is a cross-sectional view taken along line I-I' of FIG. 3.
Figure 5:
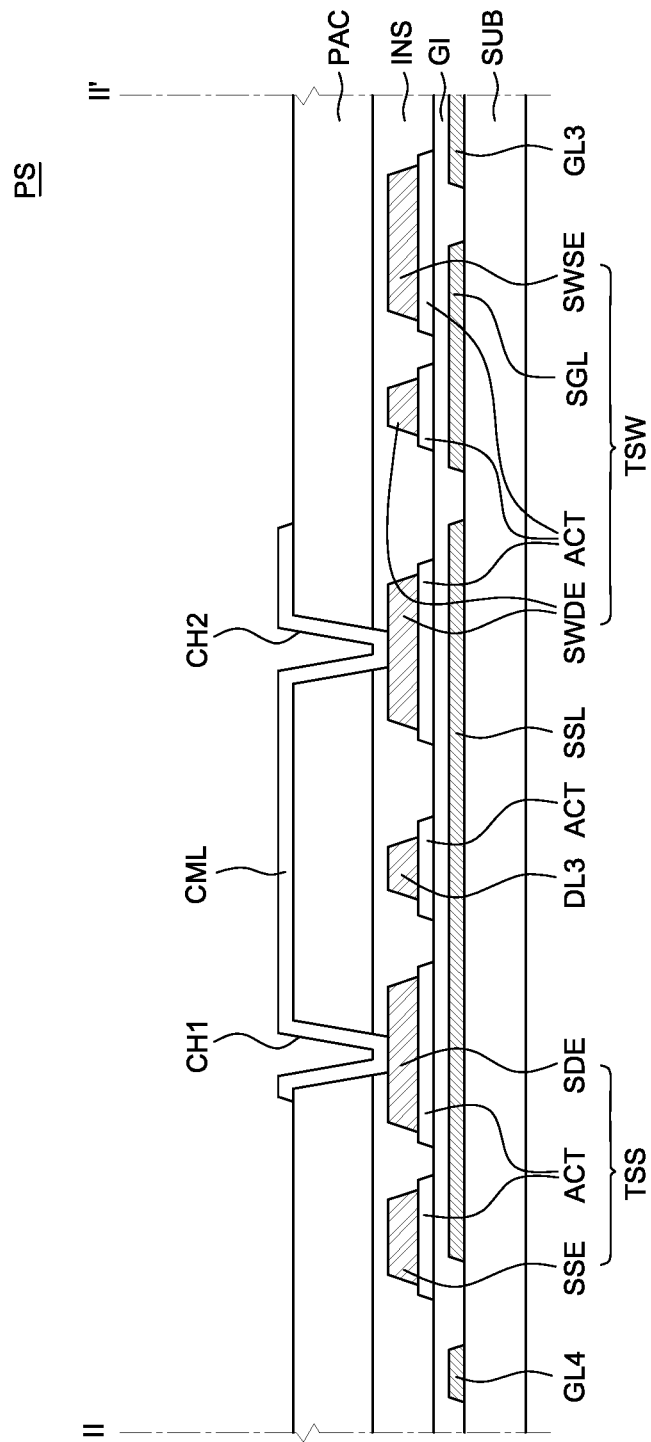
FIG. 5 is a cross-sectional view taken along line II-IT of FIG. 3.

FIG. 2 is an equivalent circuit diagram illustrating an example of a sensor pixel block disposed in a display panel according to an exemplary aspect of the present disclosure. FIG. 3 is a plan view of a sensor pixel block of FIG. 2. FIG. 4 is a cross-sectional view taken along line I-I' of FIG. 3. FIG. 5 is a cross-sectional view taken along line II-IT of FIG. 3.

First, referring to FIG. 2, a sensor pixel unit SPU of the display panel 100 according to the exemplary aspect of the present disclosure may include a pixel area PA in which a plurality of pixels P is disposed to display images and a sensor area SA in which a photo touch sensor PS is disposed to sense light reflected by the touch and recognize the touch.

In the pixel area PA, a plurality of pixels P is disposed and the plurality of pixels P may be red, green, and blue sub pixels. The plurality of pixels P may be disposed in the DRD manner. More specifically, adjacent pixels among the plurality of pixels P, for example, a first pixel P1 and a second pixel P2 are electrically connected to the first data line DL1 which is the same data line and connected to different gate lines, for example, a first gate line GL1 and a second gate line GL2, respectively. In the pixel area PA, a first common line CL1 and a second common line CL2 which are disposed in a first direction, the first gate line GL1 and the second gate line GL2 which are disposed between the first common line CL1 and the second common line CL2, the first data line to third data line DL1 to DL3 which are disposed in a second direction different from the first direction, an auxiliary line AL which is disposed between the first data line DL1 and the second data line DL2 in the second direction, a sensor data line SDL disposed between the second data line DL2 and the third data line DL3, and a read out line RL disposed to be adjacent to the third data line DL3 may be disposed. In this case, the lines disposed in the second direction extend to the sensor area SA. In this case, the sensor data line SDL is a line which transmits a sensor data signal, that is, a photo touch sensor driving signal to the photo touch sensor PS disposed in the sensor area SA.

Referring to FIG. 2, each of the plurality of pixels P includes a pixel thin film transistor TPx, a pixel capacitor PClc and a pixel storage capacitor PCst which are connected to the pixel thin film transistor TPx in parallel. Each pixel P is configured by a pixel electrode connected to the pixel thin film transistor TPx, a common electrode which supplies a common voltage, and a liquid crystal layer in which liquid crystals are tilted by a vertical electric field or a horizontal electric field by the pixel electrode and the common electrode. The pixel thin film transistor TPx stores a data signal which is applied from the data line DL in response to a gate signal applied from the gate line GL in the pixel capacitor PClc and the pixel storage capacitor PCst. As described above, the liquid crystals are driven in accordance with the data signal stored in the pixel capacitor PClc and the pixel storage capacitor PCst stably maintains a data signal of the pixel capacitor PClc. In FIG. 2, even though it is described that the display panel 100 according to the exemplary aspect of the present disclosure is a liquid crystal, the display panel is not limited thereto. For example, the display panel 100 according to the exemplary aspect of the present disclosure may be an organic light emitting display panel. When the display panel 100 is an organic light emitting display panel, an anode connected to the pixel thin film transistor TPx, a light emitting layer which is formed of an organic material, and a cathode may be included.

Referring to FIG. 3, each pixel P includes an opening area where images are displayed by the pixel electrode PE and the common electrode CE and a non-opening area where no image is displayed and a driving element for driving the pixel electrode PE and the common electrode CE of the opening area, for example the pixel thin film transistor TPx is disposed.

In the opening area, the pixel electrode PE and the common electrode CE are disposed.

The pixel electrode PE forms an electric field with the common electrode CE and makes the liquid crystal molecules of a liquid crystal layer tilted by the electric field formed as described above to allow the display panel 100 to display images. The pixel electrode PE includes a plurality of pixel branch electrode units PEb which is disposed in a line with the same interval and a plurality of pixel stem electrode units PEc which connects the plurality of pixel branch electrode units PEb. The pixel electrode PE may be disposed not only in the opening area, but also extend to be disposed in the non-opening area.

The common electrode CE includes a plurality of common branch electrode units CEb which is disposed in a line with the same interval and a plurality of common stem electrode units CEc which connects the plurality of common branch electrode units CEb. Th common branch electrode units CEb may be alternately disposed with the plurality of pixel branch electrode units PEb of the pixel electrode PE or disposed to be adjacent to the data line DL. The common electrode CE may be generally disposed on a front surface of the display panel 100.

In the non-opening area, a plurality of gate lines GL3 and GL4, a plurality of data lines DL2 and DL3, an auxiliary line AL, a sensing data line SDL, a read out line RL, a pixel thin film transistor TPx, a sensing storage line SSL, a sensing gate line SGL, a sensing thin film transistor Tss, a sensing switch thin film transistor Tsw, and a sensing storage capacitor SCst may be disposed. In this case, the sensing storage line SSL, the sensing gate line SGL, the sensing thin film transistor Tss, the sensing switch thin film transistor Tsw, and the sensing storage capacitor SCst are components which are disposed only in the sensor area SA, which will be described in detail. Even though it is not denoted by the reference numeral in the drawing, a shielding line which shields light may be disposed to enclose the auxiliary line AL, the second data line DL2, the third data line DL3, the sensor data line SDL, and the read out line RL which are disposed in the second direction. As described above, the auxiliary line AL, the sensor data line SDL, and the read out line RL which are disposed in the second direction are not separately disposed lines, but are signal lines disposed in an area where the data line is disposed in a normal display device which is not formed by a DRD manner. Therefore, in the display panel 100 according to the exemplary aspect of the present disclosure, there is no need to add a separate line to dispose the photo touch sensor PS.

As illustrated in FIG. 3, the pixel thin film transistor TPx includes a third gate electrode GL3 serving as a gate electrode, a source electrode branched from the second data line DL2 or the third data line DL3, and a drain electrode which is disposed to be spaced apart from the source electrode.

The sensing data line SDL is disposed between the second data line DL2 and the third data line DL3 and is connected to the sensing thin film transistor Tss to apply a sensor driving signal or a sensor driving voltage to the sensing thin film transistor Tss. The sensor driving voltage which is applied to the sensing thin film transistor Tss may be applied from the touch driving circuit 500 or the timing controller 400.

The read out line RL may be electrically connected to the common electrode of the opening area and the sensor switch thin film transistor Tsw of the photo touch sensor area PA. Therefore, the read out line RL may transmit a touch sensing signal by the common electrode and a touch sensing signal by the photo touch sensor PS to the touch driving circuit 500. The read out lines RL may be disposed to form one to one correspondence with the sensor pixel units SPU.

A cross-sectional structure of the pixel area PA configured as described above will be described in more detail.

Referring to FIG. 4, in the display panel 100 according to an exemplary aspect of the present disclosure, a gate insulating layer GI is disposed on a substrate SUB. The gate insulating layer GI may be formed of a silicon oxide film SiOx, a silicon nitride film SiNx, or multiple layers thereof. An active layer ACT is disposed on the gate insulating layer GI. The active layer ACT, for example, may be formed of any one of semiconductor materials such as a polycrystalline silicon, a low temperature polysilicon, and an oxide semiconductor. A third data line DL3 is disposed on the active layer ACT.

The third data line DL3 may be formed of one of molybdenum (Mo), aluminum (Al), chrome (Cr), gold (Au), titanium (Ti), nickel (Ni), neodymium (Nd), and copper (Cu) or an alloy thereof. An insulating layer INS may be disposed on the third data line DL3.

The insulating layer INS is provided to insulate the third data line DL3 from components on an upper layer and for example, may be formed of a silicon oxide film SiOx, a silicon nitride film SiNx, or multiple layers thereof. A planarization layer PAC is disposed on the insulating layer INS. Even though not illustrated in FIG. 4, on the insulating layer INS, any one of red, green, and blue color filters is disposed or two or more color filters are laminated.

The planarization layer PAC is provided to planarize a step therebelow, for example, may be formed of an organic material such as photo acryl, polyimide, benzocyclobutene resin, or acrylate resin. The pixel electrode PE and the common electrode CE are disposed on the planarization layer PAC.

The pixel electrodes PE and the common electrodes CE are alternately disposed on the planarization layer PAC. More specifically, in the opening area, the common branch electrode units CEb and the pixel branch electrode units PEb may be alternately disposed. The common electrode CE and the pixel electrode PE form an electric field to tilt the liquid crystals. The common electrode CE and the pixel electrode PE may be formed of a transparent conductive layer. The transparent conductive layer may be a material which is transparent and has a conductivity, such as indium tin oxide (ITO) and indium zinc oxide (IZO). In FIG. 4, it is illustrated that the common electrode CE and the pixel electrode PE are disposed on the same layer, but are not limited thereto. The common electrode CE and the pixel electrode PE may be disposed on different layers. When the common electrode CE and the pixel electrode PE are disposed on different layers, for example, when the common electrode CE is disposed on the planarization layer PAC, a second insulating layer is disposed on the common electrode CE and the pixel electrode PE is disposed on the second insulating layer. Further, when a plurality of sensing lines which is electrically connected to the common electrode CE is included, if the sensing lines are disposed on the planarization layer PAC, the common electrode CE and the pixel electrode PE may be disposed on the second insulating layer.

Next, the sensor area SA will be described.

The sensor area SA is an area where the photo touch sensors PS are disposed. More specifically, referring to FIG. 2, in the sensor area SA, a third gate line GL3 and a fourth gate line GL4 which are disposed in the first direction, a sensor storage line SSL and a sensor gate line SGL which are disposed between the third gate line GL3 and the fourth gate line GL4, and a sensor data line SDL and a read out line RL which are disposed in the second direction may be disposed. The sensor area SA includes only the non-opening area where no image is displayed. Here, the sensor storage line SSL is a line disposed due to the arrangement of the sensor storage capacitor SCst and the sensor gate line SGL is a line which transmits the gate signal to the sensor switch thin film transistor Tsw. As described above, in the display device according to the exemplary aspect of the present disclosure, the sensor storage line SSL, the sensor gate line SGL, and the sensor data line SDL are disposed to dispose the touch photo sensor PS. In this case, the pixel is disposed with a DRD structure and the photo touch sensor PS is disposed so that there is no need to prepare a separate area for disposing the sensor data line SDL.

The photo touch sensor PS determines whether to be touched in accordance with the intensity of incident light or reflected light to output the touch sensing signal to the read out line RL. The photo touch sensor PS may be disposed so as to correspond to the unit of the sensor pixel unit SPU. That is, one photo touch sensor PS per sensor pixel unit SPU may be disposed. The photo touch sensor PS may include a sensor thin film transistor Tss, a sensor storage capacitor SCst, and a sensor switch thin film transistor Tsw.

The sensor thin film transistor Tss generates a light leakage current in response to the intensity of the incident light or the reflected light and stores the light leakage current in the sensor storage capacitor SCst. A gate electrode of the sensor thin film transistor Tss is connected to the sensor storage line SSL, a first electrode is connected to the sensor data line SDL, and a second electrode is connected to the sensor storage capacitor SCst.

The sensor storage capacitor SCst stores an output signal of the sensor thin film transistor Tss. The sensor storage capacitor SCst may be connected to the second electrode of the sensor thin film transistor Tss and the sensor storage line SSL.

The sensor switch thin film transistor Tsw outputs a signal stored in the sensor storage capacitor SCst to the read out line RL in response to the gate signal of the sensor gate line SGL. A gate electrode of the sensor switch thin film transistor Tsw is connected to the sensor gate line SGL and the first electrode and the second electrode are connected to the sensor storage capacitor SCst and the read out line RL, respectively.

A cross-sectional structure of the sensor area SA configured as described above will be described in more detail.

Referring to FIG. 5, the fourth gate line GL4, the sensor storage line SSL, the sensor gate line SGL, and the third gate line GL3 are disposed on the substrate SUB to be spaced apart from each other. The fourth gate line GL4, the sensor storage line SSL, the sensor gate line SGL, and the third gate line GL3 may be formed of the same material, for example, may be formed of one of molybdenum (Mo), aluminum (Al), chrome (Cr), gold (Au), titanium (Ti), nickel (Ni), neodymium (Nd), and copper (Cu) or an alloy thereof. A gate insulating layer GI is disposed on the fourth gate line GL4, the sensor storage line SSL, the sensor gate line SGL, and the third gate line GL3.

The gate insulating layer GI may be formed of a silicon oxide film SiOx, a silicon nitride film SiNx, or multiple layers thereof. An active layer ACT is disposed on the gate insulating layer GI.

The active layer ACT, for example, may be formed of any one of semiconductor materials such as a polycrystalline silicon, a low temperature polysilicon, and an oxide semiconductor. On the active layer ACT, a first source electrode SSE branched from the sensor data line SDL, a first drain electrode SDE, a third data line DL3, and a second drain electrode SWDE which are spaced apart from the first source electrode SSE, and a second source electrode SWSE which is branched from the read out line RL. Here, the first source electrode SSE, the first drain electrode SDE, and the sensor storage line SSL serving as a gate electrode form a sensor thin film transistor Tss. That is, the first source electrode SSE serves as a first electrode of the sensor thin film transistor Tss and the first drain electrode SDE serves as a second electrode of the sensor thin film transistor Tss. Further, the second source electrode SWSE, the second drain electrode SWDE, and the sensor gate line SGL serving as a gate electrode form a sensor switch thin film transistor Tsw. That is, the second source electrode SWSE serves as a first electrode of the sensor switch thin film transistor Tsw and the second drain electrode SWDE serves as a second electrode of the sensor switch thin film transistor Tsw. The first source electrode SSE, the first drain electrode SDE, the third data line DL3, the second drain electrode SWDE, and the second source electrode SWSE may be formed of one of molybdenum (Mo), aluminum (Al), chrome (Cr), gold (Au), titanium (Ti), nickel (Ni), neodymium (Nd), and copper (Cu) or an alloy thereof. A insulating layer INS is disposed on the first source electrode SSE, the first drain electrode SDE, the third data line DL3, the second drain electrode SWDE, and the second source electrode SWSE.

The insulating layer INS is provided to insulate the first source electrode SSE, the first drain electrode SDE, the third data line DL3, the second drain electrode SWDE, and second source electrode SWSE from components on an upper layer. For example, the insulating layer INS may be formed of a silicon oxide film SiOx, a silicon nitride film SiNx, or multiple layers thereof. A planarization layer PAC is disposed on the insulating layer INS. Even though not illustrated in FIG. 5, on the insulating layer INS, any one of red, green, and blue color filters is disposed or two or more color filters are laminated.

The planarization layer PAC is provided to planarize a step therebelow, for example, may be formed of an organic material such as photo acryl, polyimide, benzocyclobutene resin, or acrylate resin. A connection metal line CML is disposed on the planarization layer PAC.

The connection metal line CML is electrically connected to the first drain electrode SDE through a first contact hole CH1 formed on the insulating layer INS and the planarization layer PAC. Further, the connection metal line CML is electrically connected to the second drain electrode SWDE through a second contact hole CH2 formed on the insulating layer INS and the planarization layer PAC. Such a connection metal line CML may form the sensor storage capacitor SCst.

As described above, in the display device according to the exemplary aspect of the present disclosure, the pixels are configured in the DRD manner so that there is no need to prepare a separate area for disposing the sensor data line SDL. Therefore, as compared with a case when a normal display device includes a photo touch sensor, reduction of an aperture ratio in the second direction may be minimized.

However, since the sensor gate line SGL and the sensor storage line SSL are added in the first direction, an aperture ratio loss may be caused. Therefore, in order to minimize the reduction of the aperture ratio in the first direction of the display device, a display device according to the following exemplary aspect will be suggested.

Figure 6:
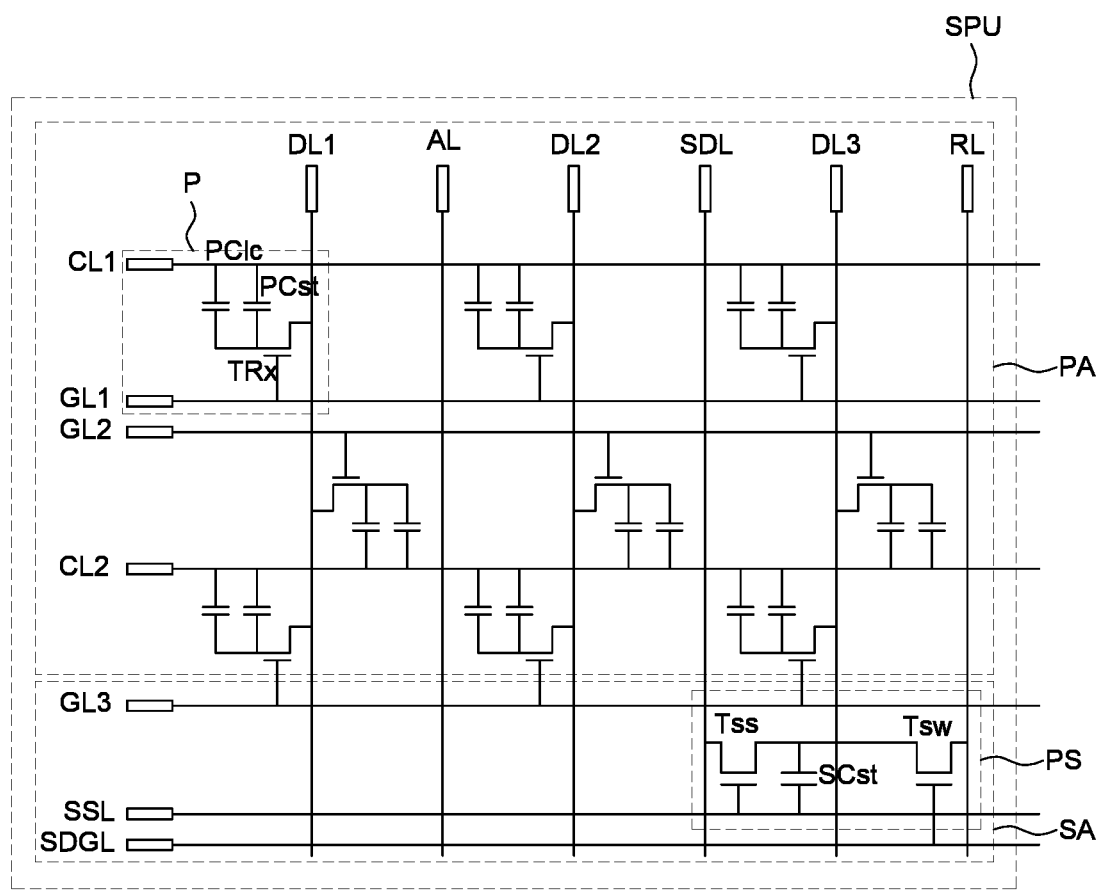
FIG. 6 is an equivalent circuit diagram illustrating an example of a display panel according to another exemplary aspect of the present disclosure.
Figure 7:
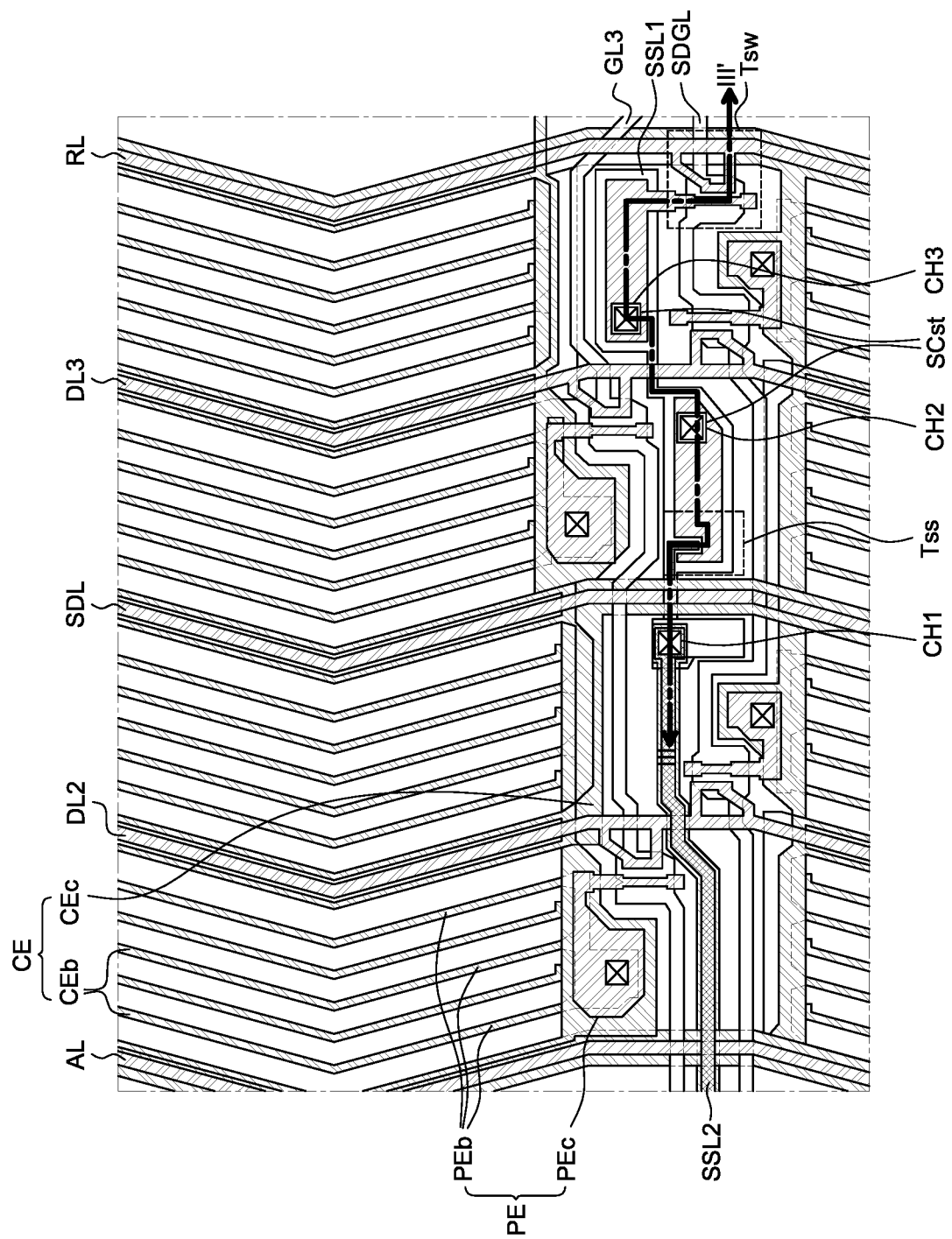
FIG. 7 is a plan view illustrating a partial structure of FIG. 6.
Figure 8:
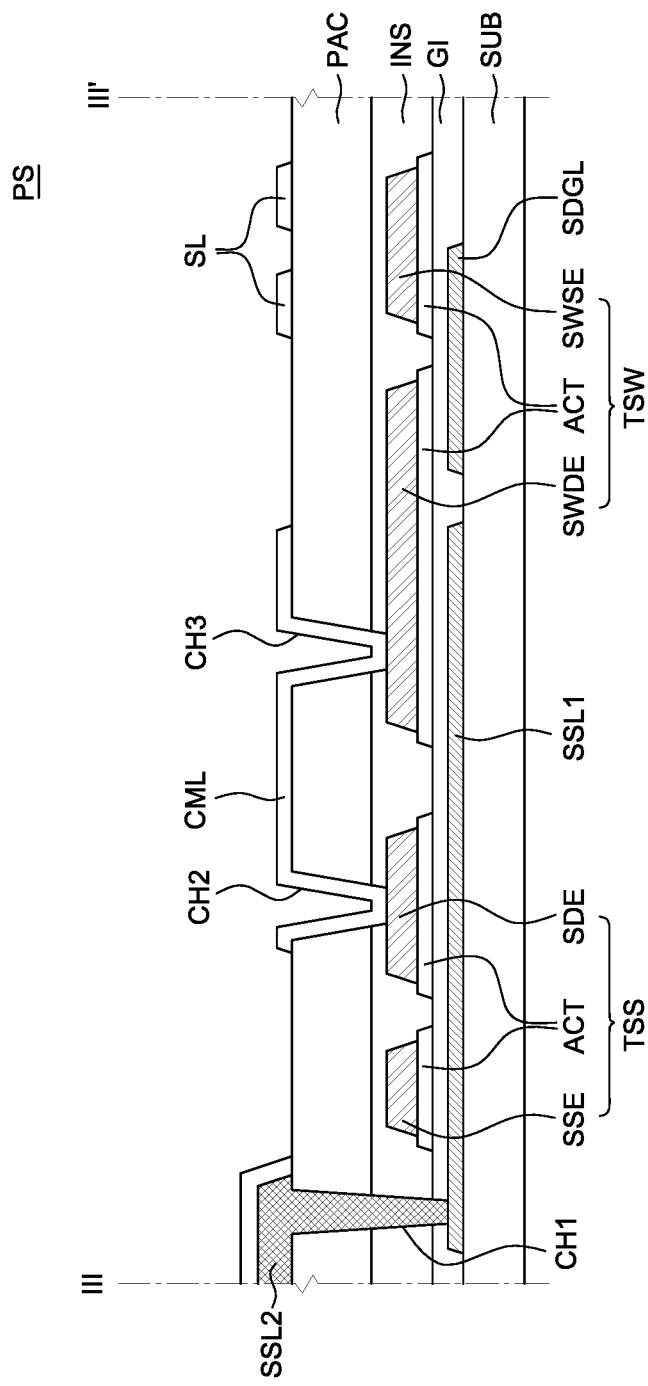
FIG. 8 is a cross-sectional view taken along line III-III' of FIG. 7.

FIG. 6 is an equivalent circuit diagram illustrating an example of a display panel according to another exemplary aspect of the present disclosure. FIG. 7 is a plan view illustrating a partial structure of FIG. 6. FIG. 8 is a cross-sectional view taken along line III-III' of FIG. 7.

Prior to referring to FIGS. 6 to 8, in a display panel according to another exemplary aspect of the present disclosure, some components are the same as those in the display panel according to the exemplary aspect of the present disclosure which has been described above with reference to FIGS. 2 to 5. More specifically, a pixel area PA of the display panel according to another exemplary aspect of the present disclosure illustrated in FIGS. 6 to 8 is configured to be the same as the pixel area of the display panel according to the exemplary aspect of the present disclosure illustrated in FIGS. 2 to 5. Accordingly, in the following description, a detailed description of the pixel area PA will be omitted and a sensor area SA will be mainly described.

Referring to FIG. 6, in the sensor area SA of the display panel according to another exemplary aspect of the present disclosure, a third gate line GL3, a sensor storage line SSL, and a sensor display gate line SDGL are disposed in the first direction and a sensor data line SDL and a read out line RL are disposed in the second direction different from the first direction.

The sensor storage line SSL is a line disposed due to the arrangement of the sensor storage capacitor SCst. As illustrated in FIG. 7, the sensor storage line SSL includes a first sensor storage line SSL1 and a second sensor storage line SSL2. The first sensor storage line SSL1 and the second sensor storage line SSL2 are electrically connected to each other through a first contact hole CH1 which is disposed to be adjacent to the sensor data line SDL. The first sensor storage line SSL1 and the second sensor storage line SSL2 may be disposed on different layers, as illustrated in FIG. 8. As described above, the first sensor storage line SSL1 and the second sensor storage line SSL2 are disposed on different layers so that a size of the sensor area SA which is a non-opening area may be reduced.

The sensor display gate line SDGL simultaneously transmits a gate signal to the pixels P disposed in the pixel area PA and transmits a sensor gate signal to the photo touch sensor SP disposed in the sensor area SA. That is, the sensor display gate line SDGL is a line which is disposed by combining the sensor gate line SGL and the fourth gate line GL4 in the display device according to the exemplary aspect of the present disclosure illustrated in FIG. 2. Therefore, a size of the sensor area SA of the display panel according to another exemplary aspect of the present disclosure is smaller than a size of the sensor area SA of the display panel 100 according to the exemplary aspect of the present disclosure. Therefore, reduction in an aperture ratio due to the arrangement of the photo touch sensor PS may be minimized.

The photo touch sensor PS according to another exemplary aspect of the present disclosure may include a sensor thin film transistor Tss, a sensor storage capacitor SCst, and a sensor switch thin film transistor Tsw.

The sensor thin film transistor Tss generates a light leakage current in response to the intensity of the incident light or the reflected light and stores the light leakage current in the sensor storage capacitor SCst. A gate electrode of the sensor thin film transistor Tss is connected to the sensor storage line SSL, a first electrode is connected to the sensor data line SDL, and a second electrode is connected to the sensor storage capacitor SCst.

The sensor storage capacitor SCst stores an output signal of the sensor thin film transistor Tss. The sensor storage capacitor SCst may be formed by electrically connecting the second electrode of the sensor thin film transistor Tss and the second electrode of the sensor switch thin film transistor Tsw.

The sensor switch thin film transistor Tsw outputs a touch sensing signal stored in the sensor storage capacitor SCst to the read out line RL in response to the sensor gate signal applied from the sensor display gate line SDGL. A gate electrode of the sensor switch thin film transistor Tsw is connected to the sensor display gate line SDGL and the first electrode and the second electrode are connected to the sensor storage capacitor SCst and the read out line RL, respectively.

A cross-sectional structure of the sensor area SA configured as described above will be described in more detail.

Referring to FIG. 8, the first sensor storage line SSL1 and the sensor display gate line SDGL are disposed on the substrate SUB. The first sensor storage line SSL1 and the sensor display gate line SDGL may be formed of the same material, for example, may be formed of one of molybdenum (Mo), aluminum (Al), chrome (Cr), gold (Au), titanium (Ti), nickel (Ni), neodymium (Nd), and copper (Cu) or an alloy thereof. A gate insulating layer GI is disposed on the first sensor storage line SSL1 and the sensor display gate line SDGL.

The gate insulating layer GI may be formed of a silicon oxide film SiOx, a silicon nitride film SiNx, or multiple layers thereof. An active layer ACT is disposed on the gate insulating layer GI.

The active layer ACT, for example, may be formed of any one of semiconductor materials such as a polycrystalline silicon, a low temperature polysilicon, and an oxide semiconductor. On the active layer ACT, a first source electrode SSE branched from the sensor data line SDL, a first drain electrode SDE and a second drain electrode SWDE which are spaced apart from the first source electrode SSE, and a second source electrode SWSE which is branched from the read out line RL. Here, the first source electrode SSE, the first drain electrode SDE, and the sensor storage line SSL form a sensor thin film transistor Tss. That is, the first source electrode SSE serves as a first electrode of the sensor thin film transistor Tss, the first drain electrode SDE serves as a second electrode of the sensor thin film transistor Tss, and the first sensor storage line SSL serves as a gate electrode of the sensor thin film transistor Tss. Further, the second source electrode SWSE, the second drain electrode SWDE, and the sensor display gate line SDGL form a sensor switch thin film transistor Tsw. That is, the second source electrode SWSE serves as a first electrode of the sensor switch thin film transistor Tsw, the second drain electrode SWDE serves as a second electrode of the sensor switch thin film transistor Tsw, and the sensor display gate line SDGL serves as a gate electrode of the sensor switch thin film transistor Tsw. Further, the second source electrode SWSE may be a read out line RL. The first source electrode SSE, the first drain electrode SDE, the second drain electrode SWDE, and the second source electrode SWSE may be formed of one of molybdenum (Mo), aluminum (Al), chrome (Cr), gold (Au), titanium (Ti), nickel (Ni), neodymium (Nd), and copper (Cu) or an alloy thereof. An insulating layer INS is disposed on the first source electrode SSE, the first drain electrode SDE, the second drain electrode SWDE, and the second source electrode SWSE.

The insulating layer INS is provided to insulate the first source electrode SSE, the first drain electrode SDE, the second drain electrode SWDE, and the second source electrode SWSE from components on an upper layer. For example, the insulating layer INS may be formed of a silicon oxide film SiOx, a silicon nitride film SiNx, or multiple layers thereof. A planarization layer PAC is disposed on the insulating layer INS. Even though not illustrated in FIG. 9, on the insulating layer INS, any one of red, green, and blue color filters is disposed or two or more color filters are laminated.

The planarization layer PAC is provided to planarize a step therebelow, for example, may be formed of an organic material such as photo acryl, polyimide, benzocyclobutene resin, or acrylate resin. A second sensor storage line SSL2 and a connection metal line CML are disposed on the planarization layer PAC.

The second sensor storage line SSL2 is electrically connected to the first sensor storage line SSL1 disposed therebelow through a first contact hole CH1 formed on the gate insulating layer GI, the insulating layer INS, and the planarization layer PAC. As described above, in the sensor storage line SSL for disposing the photo touch sensor PS, the first sensor storage line SSL1 and the second sensor storage line SSL2 are disposed on different layers and are electrically connected to each other through a contact hole. Therefore, a width of a non-opening area is reduced and a degree of freedom for disposing the sensor storage line SSL may be improved in terms of a design. For example, the second sensor storage line SSL2 may be formed of one of molybdenum (Mo), aluminum (Al), chrome (Cr), gold (Au), titanium (Ti), nickel (Ni), neodymium (Nd), and copper (Cu) or an alloy thereof.

The connection metal line CML is electrically connected to the first drain electrode SDE through a second contact hole CH2 formed on the insulating layer INS and the planarization layer PAC. Further, the connection metal line CML is electrically connected to the second drain electrode SWDE through a third contact hole CH3 formed on the insulating layer INS and the planarization layer PAC. Such a connection metal line CML may form the sensor storage capacitor SCst.

As described above, in the display device according to another exemplary aspect of the present disclosure, a line which transmits the sensor gate signal to the photo touch sensor PS and a gate line which applies a gate signal to the corresponding pixel are combined to be disposed, so that even though the photo touch sensor PS is disposed, the reduction of the aperture ratio may be minimized.

Figure 9:
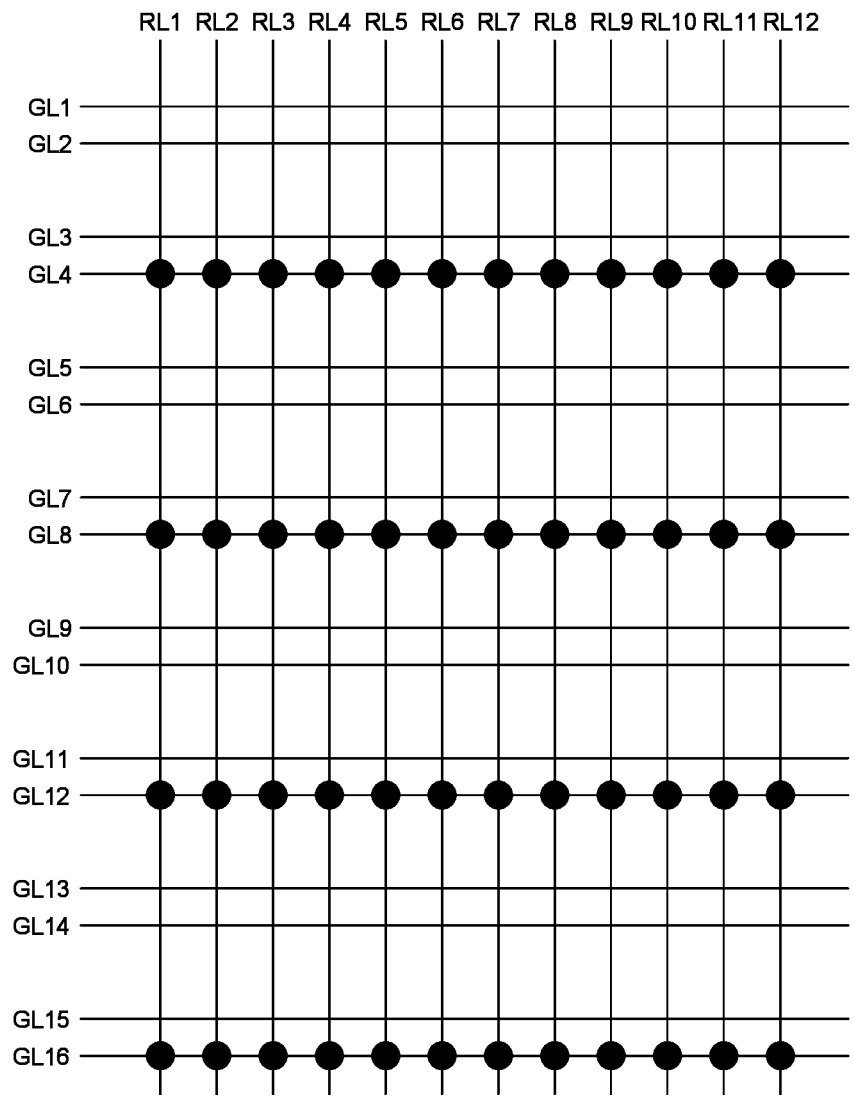
FIG. 9 is a plan view illustrating an arrangement of photo touch sensors of a display device according to an exemplary aspect of the present disclosure.

FIG. 9 is a plan view illustrating an arrangement of photo touch sensors of a display device according to an exemplary aspect of the present disclosure.

As described above, in a display device according to the exemplary aspect of the present disclosure, one read out line RL per sensor pixel unit SPU is disposed. Further, one photo touch sensor PS per sensor pixel unit SPU may be disposed. Referring to FIG. 9, in the plurality of read out lines RL1 to RL12, photo touch sensors PS (represented as dots in FIG. 9) are disposed and the touch photo sensors PS may be disposed in the unit of four gate lines. That is, the photo touch sensors PS may be disposed with a predetermined interval, for example, may be disposed in the read out line which intersects an N+2-th (N is 2 or larger positive integer) gate line along the N+2-th gate line. For example, referring to FIG. 9, a plurality of photo touch sensors may be disposed along a fourth gate line GL4, an eighth gate line GL8, a twelfth gate line GL12, and a sixteenth gate line GL16.

Therefore, in the display device according to the exemplary aspect of the present disclosure, in an area of the display panel corresponding the fourth gate line GL4, the eighth gate line GL8, the twelfth gate line GL12, and the sixteenth gate line GL16, an aperture ratio may be degraded due to the arrangement of the photo touch sensor PS. Further, the photo touch sensors PS are disposed on the same gate line, so that it may be easily recognized from the outside. Therefore, the visibility of the display device from the outside may be degraded.

Figure 10:
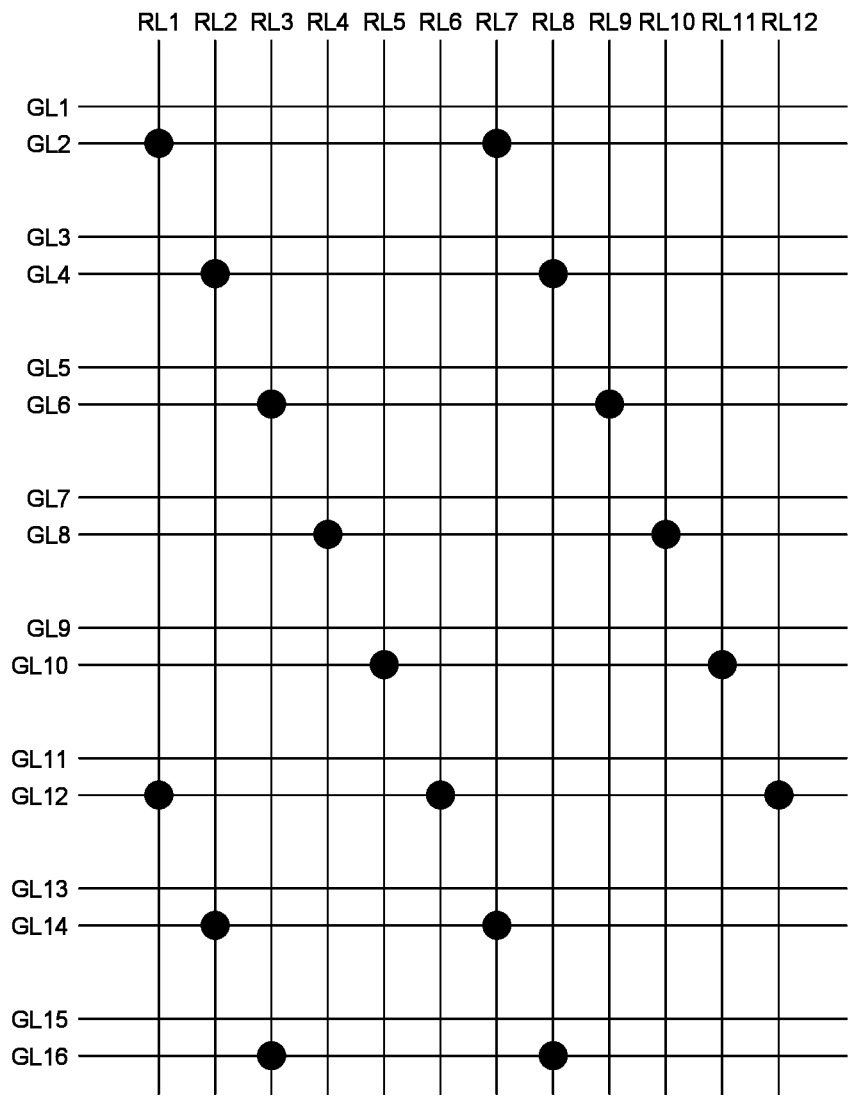
FIG. 10 is a plan view illustrating an example of an arrangement of photo touch sensors of a display device according to an exemplary aspect of the present disclosure.
Figure 11:
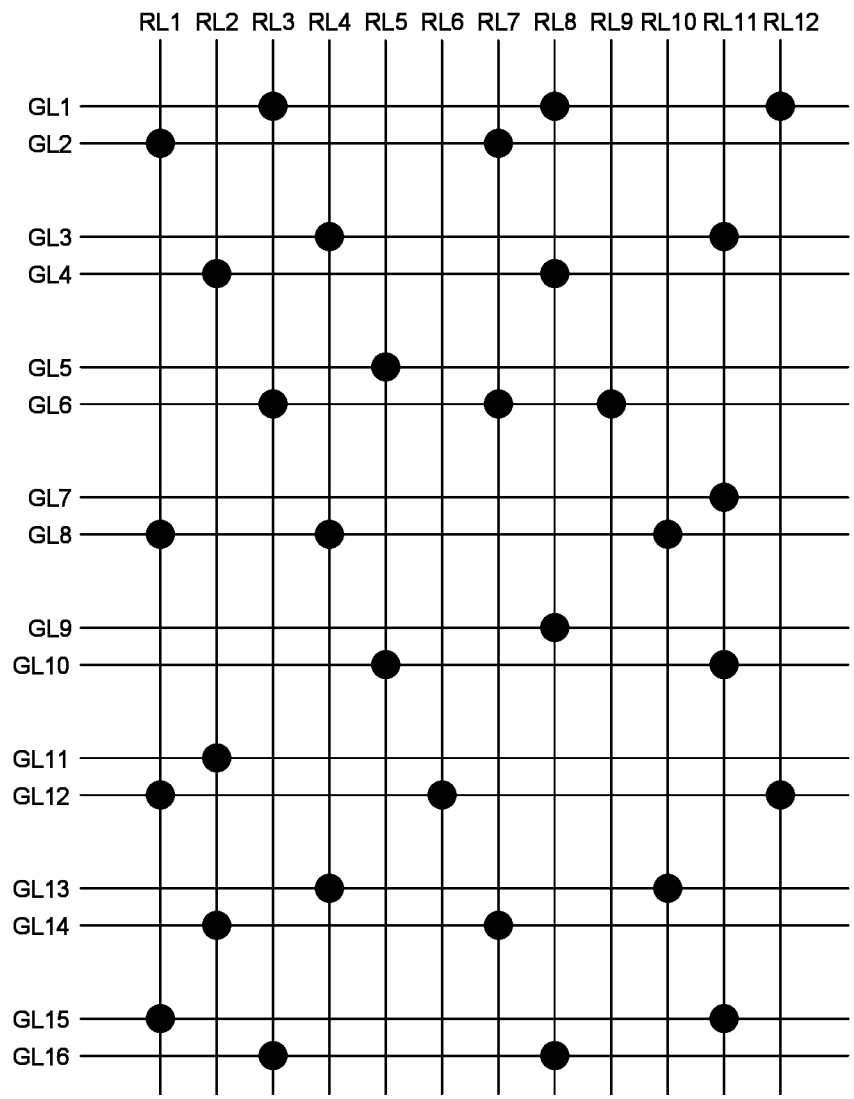
FIG. 11 is a plan view illustrating another example of an arrangement of photo touch sensors of a display device according to an exemplary aspect of the present disclosure.

In order to solve the above-mentioned problem, it is suggested to dispose the photo touch sensors as illustrated in FIGS. 10 and 11.

FIG. 10 is a plan view illustrating an example of an arrangement of photo touch sensors of a display device according to an exemplary aspect of the present disclosure. FIG. 11 is a plan view illustrating another example of an arrangement of photo touch sensors of a display device according to an exemplary aspect of the present disclosure.

Referring to FIG. 10, in the display device according to the exemplary aspect of the present disclosure, the photo touch sensors PS are not disposed in only one gate line as illustrated in FIG. 9, but the photo touch sensors PS may be distributed for every gate line. More specifically, photo sensors which are disposed in a read out line which intersects an N-th (N is a positive integer) gate line among the plurality of gate lines may be disposed in an N+2M-th gate line or a gate line disposed with an interval of (N+2M) (M is a positive integer) and a read out line which intersects the gate line.

Referring to FIG. 10, when it is assumed that two gate lines disposed in the DRD manner, for example, the first gate line GL1 and the second gate line GL2 are one pair, in the pair of gate lines GL1 and GL2, the photo touch sensors are disposed with a predetermined interval corresponding to the read out line RL. The most adjacent photo touch sensor may be disposed in another adjacent gate line pair and the read out line, not in the same gate line pair. For example, when the first gate line GL1 and the second gate line GL2 form a first gate line pair and the first photo touch sensor is disposed so as to correspond to the first gate line pair and the first read out line RL1, the second photo touch sensor is disposed corresponding to the second gate line pair which is formed by a third gate line GL3 and a fourth gate line GL4 and the second read out line RL2. That is, the photo touch sensor may be disposed to diagonally extend over the display panel. As described above, in the display device according to the exemplary aspect of the present disclosure, gate lines are designed to be symmetrical on the display panel so that capacitance Cap may be designed to be symmetrical for every line. Further, aperture ratio reduction areas by the photo touch sensors are distributed over the entire display panel so that an image quality degrading area which is recognized by the user may be distributed so that the degradation of the visibility of the user may be minimized.

In the meantime, even though not specifically illustrated in the drawings, since the photo touch sensors are distributed in the gate lines in consideration of capacitance, the number of photo touch sensors disposed in the exemplary aspect of FIG. 9 may be equal to the number of phot touch sensors disposed in the exemplary aspect of FIG. 10.

Further, as another method for minimizing the degradation of visibility due to the aperture ratio difference, as illustrated in FIG. 11, a method of randomly disposing the photo touch sensors may be considered. In this case, the photo touch sensors may be randomly disposed in the gate lines in consideration of capacitance Cap for every gate line.

As described above, when the photo touch sensors are distributed for every gate line while considering the capacitance for every gate line, a visibility of the display device according to the exemplary aspect of the present disclosure may be improved.

The exemplary aspects of the present disclosure can also be described as follows:

According to an aspect of the present disclosure, a display device includes a sensor pixel unit including a plurality of pixels, a photo touch sensor in the sensor pixel unit, a read out line which is disposed in a second direction and transmits a touch sensing signal by the photo touch sensor, a sensor data line which is disposed in the second direction and applies a sensor data signal to the photo touch sensor, and a sensor display gate line which is disposed in a first direction different from the second direction and applies a sensor gate signal to the photo touch sensor and applies a display gate signal to the plurality of pixels.

The photo touch sensor may include a sensor thin film transistor which is connected to the sensor data line and generates an output signal in response to a light intensity of incident light or reflected light, a sensor storage capacitor which stores an output signal output from the sensor thin film transistor, and a sensor switch thin film transistor which outputs an output signal stored in the sensor storage capacitor to the read out line in response to the sensor gate signal.

The sensor pixel unit may further include a sensor storage line disposed in the first direction to dispose the sensor storage capacitor.

The sensor pixel unit may be further disposed a connection metal line for forming the sensor storage capacitor.

The connection metal line may electrically connect a drain electrode of the sensor thin film transistor and a drain electrode of the sensor switch thin film transistor.

The sensor storage line may include a first sensing storage line and a second sensing storage line, the first sensing storage line and the second sensing storage line are disposed on different layers, and the first sensing storage line and the second sensing storage line are electrically connected to each other.

The sensor pixel unit are disposed a first pixel and a second pixel adjacent to the first pixel are disposed; a first data line which applies a data signal to the first pixel and the second pixel, a first gate line which applies a gate signal to the first pixel and a second gate line which applies a gate signal to the second pixel.

The sensor pixel unit may further include a third pixel adjacent to the second pixel and a fourth pixel adjacent to the third pixel, the third pixel and the fourth pixel may be connected to a second data line which is adjacent to the first data line, and the sensor data line may be disposed between the first data line and the second data line.

The third pixel and the fourth pixel may be disposed to be spaced apart from each other and the photo touch sensor may be disposed between the third pixel and the fourth pixel and the photo touch sensor may be distributed in consideration of capacitance.

The number of photo touch sensors disposed in an N-th gate line (N is a positive integer) may be equal to the number of photo touch sensors disposed in the N+2M-th gate line (M is a positive integer).

The sensor pixel unit and the read out line may be disposed to form a one to one correspondence with each other.

According to an another aspect of the present disclosure, a display device includes a display panel which includes a plurality of gate lines disposed in a first direction, a plurality of sdata lines disposed in a second direction different from the first direction, and photo touch sensors which sense a touch in response to a light intensity, a touch driving circuit which receives a touch sensing signal output from each of the photo touch sensors, and a read out line which transmits a touch sensing signal output from the display panel to the touch driving circuit, in which a photo sensor which is disposed in a read out line which intersects an N-th (N is a positive integer) gate line among the plurality of gate lines is disposed in an N+2-th gate line or a gate line disposed with an interval of (N+2M) (M is a positive integer) and a read out line which intersects the N+2M-th gate line.

The photo touch sensors may be disposed in the display panel to extend in a diagonal direction.

The display panel may further include a sensor storage line disposed in the first direction to dispose the photo touch sensors, a display gate line which is disposed to be spaced apart from the sensor storage line in the second direction and applies a touch gate signal to the photo touch sensor and applies a display gate signal to pixels which are electrically connected among the plurality of pixels, and a sensor data line which is disposed in the second direction and disposed between adjacent data lines among the plurality of data lines.

The sensor storage line may include a first sensor storage line disposed to correspond to an area where the photo touch sensor is disposed and a second sensor storage line which is disposed on a different layer from that of the first sensor storage line and is electrically connected to the first sensor storage line.

The plurality of gate lines and the plurality of data lines may be disposed in a double rate driving (DRD) manner.

Although the exemplary aspects of the present disclosure have been described in detail with reference to the accompanying drawings, the present disclosure is not limited thereto and may be embodied in many different forms without departing from the technical concept of the present disclosure. Therefore, the exemplary aspects of the present disclosure are provided for illustrative purposes only but not intended to limit the technical concept of the present disclosure. The scope of the technical concept of the present disclosure is not limited thereto. Therefore, it should be understood that the above-described exemplary aspects are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device, comprising:
a sensor pixel unit including a plurality of pixels;
a photo touch sensor disposed in the sensor pixel unit;

a read out line disposed in a second direction and transmitting a touch sensing signal from the photo touch sensor;
a sensor data line disposed in the second direction and transmitting a sensor data signal to the photo touch sensor; and;
a sensor display gate line disposed in a first direction different from the second direction and transmitting a sensor gate signal to the photo touch sensor and transmitting a display gate signal to the plurality of pixels,
wherein the photo touch sensor includes:
a sensor thin film transistor connected to the sensor data line and generating an output signal in response to a light intensity of incident light or reflected light;
a sensor storage capacitor storing an output signal output from the sensor thin film transistor; and;
a sensor switch thin film transistor outputting an output signal stored in the sensor storage capacitor to the read out line in response to the sensor gate signal.

2. The display device according to claim 1, wherein the sensor pixel unit further includes a sensor storage line disposed in the first direction to dispose the sensor storage capacitor.

3. The display device according to claim 2, wherein the sensor pixel unit further includes a connection metal line to form the sensor storage capacitor.

4. The display device according to claim 3, wherein the connection metal line electrically connects a drain electrode of the sensor thin film transistor and a drain electrode of the sensor switch thin film transistor.

5. The display device according to claim 2, wherein the sensor storage line includes a first sensing storage line and a second sensing storage line, wherein the first sensing storage line and the second sensing storage line are disposed on different layers, and the first sensing storage line and the second sensing storage line are electrically connected to each other.

6. The display device according to claim 1, wherein the sensor pixel unit includes:
a first pixel and a second pixel adjacent to the first pixel;
a first data line applying a data signal to the first pixel and the second pixel;
a first gate line applying a gate signal to the first pixel; and
a second gate line applying a gate signal to the second pixel.

7. The display device according to claim 6, wherein the sensor pixel unit further includes a third pixel adjacent to the second pixel and a fourth pixel adjacent to the third pixel, wherein the third pixel and the fourth pixel are connected to a second data line which is adjacent to the first data line, and the sensor data line is disposed between the first data line and the second data line.

8. The display device according to claim 7, wherein the third pixel and the fourth pixel are disposed to be spaced apart from each other, and the photo touch sensor is disposed between the third pixel and the fourth pixel and is distributed in accordance with capacitance.

9. The display device according to claim 7, wherein the number of photo touch sensors disposed in an N-th gate line (N is a positive integer) is equal to the number of photo touch sensors disposed in the N+2M-th gate line (M is a positive integer).

10. The display device according to claim 1, wherein the sensor pixel unit and the read out line are disposed to be a one to one correspondence with each other.

11. A display device, comprising:
a display panel which includes a plurality of gate lines disposed in a first direction, a plurality of data lines disposed in a second direction different from the first direction, and a plurality of photo touch sensors which senses a touch in response to a light intensity;
a touch driving circuit which receives a touch sensing signal output from the plurality of photo touch sensors; and
a read out line which transmits a touch sensing signal output from the display panel to the touch driving circuit,
wherein a photo sensor disposed in the read out line which intersects an N-th (N is a positive integer) gate line among the plurality of gate lines is disposed in an N+2-th gate line or a gate line disposed with an interval of (N+2M) (M is a positive integer) and the read out line which intersects the N+2M-th gate line.

12. The display device according to claim 11, wherein the plurality of photo touch sensors is disposed in the display panel to extend in a diagonal direction.

13. The display device according to claim 11, wherein the display panel further includes:
a sensor storage line disposed in the first direction to dispose the photo touch sensors;
a sensor display gate line disposed to be spaced apart from the sensor storage line in the second direction and applying a touch gate signal to the photo touch sensor and applies a display gate signal to pixels which are electrically connected among the plurality of pixels; and
a sensor data line disposed in the second direction and disposed between adjacent data lines among the plurality of data lines.

14. The display device according to claim 13, wherein the sensor storage line includes a first sensor storage line disposed to correspond to an area where the photo touch sensor is disposed and a second sensor storage line which is disposed on a different layer from that of the first sensor storage line and is electrically connected to the first sensor storage line.

15. The display device according to claim 14, wherein the plurality of gate lines and the plurality of data lines are disposed in a double rate driving (DRD) manner.

16. A display device, comprising:
a sensor pixel unit including a plurality of pixels;
a photo touch sensor disposed in the sensor pixel unit;
a read out line disposed in a second direction and transmitting a touch sensing signal from the photo touch sensor;
a sensor data line disposed in the second direction and transmitting a sensor data signal to the photo touch sensor; and;
a sensor display gate line disposed in a first direction different from the second direction and transmitting a sensor gate signal to the photo touch sensor and transmitting a display gate signal to the plurality of pixels,
wherein the photo sensor is randomly disposed at an intersection of the read out line and the sensor display gate line to distribute capacitance of the sensor display gate line.

17. The display device according to claim 16, wherein the photo touch sensor includes:
a sensor thin film transistor connected to the sensor data line and generating an output signal in response to a light intensity of incident light or reflected light;
a sensor storage capacitor storing an output signal output from the sensor thin film transistor; and;

a sensor switch thin film transistor outputting an output signal stored in the sensor storage capacitor to the read out line in response to the sensor gate signal.

18. The display device according to claim 17, wherein the sensor pixel unit further includes a sensor storage line disposed in the first direction to dispose the sensor storage capacitor.

19. The display device according to claim 18, wherein the sensor pixel unit further includes a connection metal line to form the sensor storage capacitor.

* * * * *